United States Patent [19]

Ide

[11] Patent Number: 5,112,143
[45] Date of Patent: May 12, 1992

[54] BEAM MOUNTED BEARING PAD AND METHODS OF MAKING SAME

[76] Inventor: Russell D. Ide, 28 Daniel Dr., Conventry, R.I. 02816

[21] Appl. No.: 283,529

[22] Filed: Oct. 25, 1988

Related U.S. Application Data

[63] Continuation-in-part of Ser. No. 55,340, May 29, 1987, abandoned.

[51] Int. Cl.$^5$ .............................................. F16C 17/03
[52] U.S. Cl. .................................... 384/117; 384/107; 384/119
[58] Field of Search ............... 384/117, 119, 107, 125, 384/312

[56] References Cited

U.S. PATENT DOCUMENTS

| | | | |
|---|---|---|---|
| 3,899,224 | 8/1975 | Schuller et al. | 384/119 |
| 4,496,251 | 1/1985 | Ide | 384/117 |
| 4,676,668 | 6/1987 | Ide | 384/117 |

FOREIGN PATENT DOCUMENTS

57-58124  9/1982  Japan.

Primary Examiner—Lenard A. Footland
Attorney, Agent, or Firm—Marks & Murase

[57] ABSTRACT

A hydrodynamic bearing and methods of manufacturing the same. The bearing includes a bearing pad structure that may change shape and move in any direction (six degrees of freedom) to form a converging wedge for hydrodynamic operation, and to adjust for any shaft misalignment. The pad is separated from the support member by one or more beam-like members the beams extend substantially parallel to the plane of the face of the pad. The beams allow deflection of the pad by either deflecting or twisting in a torsional mode. The bearings may be made of a wide variety of materials including, plastics, ceramics, powdered metals, composites and metals. The bearings may be manufactured by injection molding, casting, powdered metal die casting, extrusion, electric discharge or laser cutting.

38 Claims, 4 Drawing Sheets

FIG.14C    FIG.14D

BEAM MOUNTED BEARING PAD AND METHODS OF MAKING SAME

BACKGROUND OF THE INVENTION

This application is a continuation-in-part of, and claims the benefits of 35 U.S.C. §120 with respect to the applicant's copending U.S. Patent application Ser. No. 07/055,340, filed May 29, 1987, abandoned.

The present invention relates to hydrodynamic bearings that are also sometimes known as swing pad bearings and methods of making the same. Generally these bearings are mounted in such a way that they can move to permit the formation of a wedge-shaped film of lubricant between the relatively moving parts. Essentially the pad displaces with a pivoting or a swing-type motion about a center located in front of the pad surface, and bearing friction tends to open the wedge.

In the Hall patent, U.S. Pat. No. 2,137,487, there is shown a hydrodynamic moveable pad bearing that develops its hydrodynamic wedge by sliding of its pad along spherical surfaces. In many cases the pad sticks and the corresponding wedge cannot be developed. In the Greene Patent, U.S. Pat. No. 3,930,691, the rocking is provided by elastomers that are subject to contamination and deterioration.

There is shown in the Ide patent, U.S. Pat. No. 4,496,251 a pad which deflects with web-like ligaments so that a wedge shaped film of lubricant is formed between the relative moving parts.

It has also been noted in Ide U.S. Pat. No. 4,676,668, that bearing pads may be spaced from the support member by at least one leg which provides flexibility in three directions. To provide flexibility in the plane of motion, the legs are angled inward to form a conical shape with the point of intersection in front of the pad surface. Each leg has a section modulus that is relatively small in the direction of desired motion to permit compensation for misalignments.

SUMMARY OF THE INVENTION

The present invention discloses a pad type bearing and methods of making the same. The pad type bearing consists of a, preferably unitary, cylindrical journal that has been machined or formed with small grooves and slits or cuts through or on the journal wall to define a flexible pad and a support structure capable of supporting the pad for movement in the six degrees of freedom (i.e., movement in the tx, −x, +y, −y, +z and −z directions.) The support structure is preferably unitary and comprises support stubs, beams, and/or membranes connected to a housing which is defined by the radially outermost portion of the bearing.

The inventor has discovered that in many specific applications such as in high speed applications, it is necessary to examine and evaluate the dynamic flexibility of the entire system consisting of the shaft or rotor, the hydrodynamic lubricating film and the bearing. In computer analysis of this system using a finite element model, it has been determined that it is necessary to treat the entire bearing as a completely flexible member that changes shape under operating loads. By adding more or less flexibility via machining of the basic structure, bearing characteristics may be achieved that provide stable low friction operation over wide operating ranges. A number of variables have been found to substantially affect the bearing's performance characteristics. Among the most important variables are the shape, size, location and material characteristics (e.g. modulus of elasticity etc.) of the pad and support members defined by the slits or cuts and grooves formed in the bearing. The shape of the support members has been found to be particularly important. Also by providing a fluid backing to the flexible members, a high degree of damping may be achieved that further adds to system stability. In some instances, this damping has replaced secondary squeeze film dampening that is present when the oil film is present between the casing of the bearing and the housing.

Specific applications of the bearing of the present invention include turbochargers, turbines and compressors/expanders. Test speeds have exceeded 300,000 r.p.m. It is noted that the machining cuts, in addition to allowing the bearing pad to move to form a converging wedge for hydrodynamic lubrication, allow the pad itself to deflect and change shape by for example flattening. This improves operating performance by, among other things, changing the eccentricity of the bearing.

The bearings may be formed of metals, powdered metals, plastics, ceramics or composites. When manufactured in small quantities, the cuts are typically made by electrical discharge or laser machining methods and allow total design flexibility to tune the bearing to provide desired characteristics. Tuning will essentially change the stiffness that in turn eliminates vibration. Manufacture of large quantities of a single type bearing is preferably accomplished through injection molding, casting, powdered metal die casting with sintering and extrusion or the like.

Unlike prior pad type bearings which have a support structure that is essentially oriented in the direction of load, the present invention provides an orientation that allows for comparable deflections within a smaller envelope (i.e., the difference between the radially inner journal surface and the radially outer journal surface); allows for movement of the bearing pad in any direction (i.e., six degrees of freedom) to form a converging wedge shape; allows for the pad itself to change shape (e.g., flatten) to improve performance, and allows for development of a membrane damping system for improved stability. While there are numerous arrangements of grooves, cuts, or slits there are primarily two modes of deflections, namely one or more ligaments or membranes which deflect in the general direction of load in a bending mode and secondly by torsional deflection in a beam or member in a direction extending away from the pad along the longitudinal axis of the shaft. The degree of deflection in the bending mode is, in part, a function of the stiffness of the support structure in the radial direction. The pad itself may be made to deflect under a load to form a different shape by providing internal cuts beneath the pad or via undercutting the edges of the pad. In either case the cuts are specifically made to result in a predetermined shape under load. By surrounding or backing certain ligaments or membranes with lubricating fluid, a damping element may be added to the design.

The bearing of the present invention includes a pad that may change shape and move in any direction (i.e., is supported for movement with six degrees of freedom). The bearing also may have a built-in damping system and is preferably of unitary or single piece construction for high volume economical manufacture. The bearing also fits in a relatively small envelope (i.e., spacing between the housing outer diameter and the pad inner diameter). Further, the need for close tolerances between the bearing inner diameter and shaft outer diameter can be obviated by dimensioning the bearing so as to eliminate the spacing between the bearing inner diameter and shaft outer diameter while at the same time dimensioning the support structure such that the radial stiffness of the bearing is less that the radial fluid-film stiffness of the supporting fluid. In such an instance, an appropriate spacing between the pad and the shaft will be established instantaneously upon rotation of the shaft by virtue of the stiffness of the fluid-film. In the bearing of the present invention, the pad movement may be directed towards the shaft to hold shaft location and to give the pad the ability to adjust for misalignment of the shaft and unequal loading among pads. Of course, the present invention may apply to any radial, thrust or combined radial and thrust forms of bearings and may be one or two directional in nature, depending on the configuration of the bearing.

In accordance with the present invention, a number of methods of manufacturing the bearings of the present invention are also contemplated. The selection of a particular method of manufacturing depends largely on the volume of the particular bearing to be manufactured and the materials used. In low volume applications, or when it is desired to produce prototypes for testing and/or production of molds or the like, the bearings are preferably manufactured from metallic cylindrical blanks or journals which are machined to provided radial and/or facing grooves and formed with radial cuts or slits through either numerically controlled electrical discharge manufacturing techniques or numerically controlled laser cutting techniques. In high volume applications, the bearings of the present invention can be manufactured using a wide variety of materials such as plastics, ceramics, powdered and non-powdered metals, and composites. In high volume applications, a number of manufacturing methods including injection molding, casting, powdered metal die casting, and extrusion can be employed.

BRIEF DESCRIPTION OF THE DRAWINGS

The details of the invention will be described in connection with the accompanying drawing, in which.

DETAILED DESCRIPTION OF THE ILLUSTRATIVE EMBODIMENTS

Figure 1:
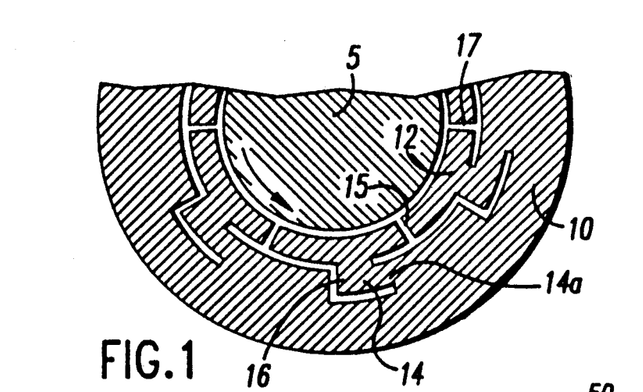
FIG. 1 is a sectional view of a journal bearing illustrating a sector thereof embodying one form of the invention.

Referring first to FIG. 1, the structure therein illustrated is a sector of a bearing assembly having grooves and slits formed therein so as to define a housing lo and a plurality of circumferentially arranged bearing pads 12 each of which is supported from the housing by a beam 14 and a stub section 16. The bearing illustrated is a radial unidirectional bearing, i.e., it is adapted for radially supporting a shaft for rotation in only one direction. In the illustrated embodiment, the bearing supports the shaft 5 only for rotation in the counter-clockwise direction illustrated by the arrow. Each bearing pad 12 includes a leading edge 15 and a trailing edge 17. The leading edge is defined as the edge first approached by a point on the circumference of the shaft as it continues to rotate. Similarly, the trailing edge is defined as the edge approached circumferentially later by the same point on the shaft as it continues to rotate. When the shaft 5 is rotating in the proper direction, it moves, on a fluid film, from the leading edge across the bearing pad and off the trailing edge. Optimum performance is obtained when the stub-section 16 supports the bearing pad 12 and hence any load, at a point 16a (FIG. 3) between the circumferential center line 13a of the pad 12 and the trailing edge 17 preferably, closer to the center line 13a. The beam 14 should also pivot about a point 14a which is located angularly between the leading edge and the trailing edge so that as a result of deflection of the beam 14, the trailing edge 17 deflects inwardly. Of course, the degree of deflection depends on, among other things, the shape of the beam and the length of the cuts or slits formed in the bearing.

Figure 2:
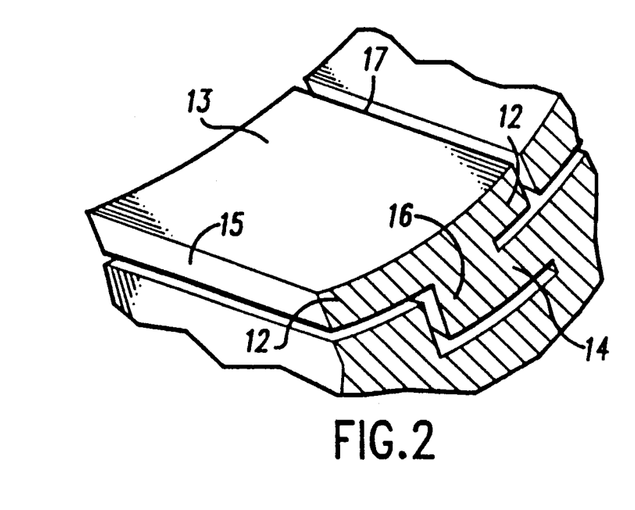
FIG. 2 is a schematic view of a single pad made in accordance with the example illustrated in FIG. 1.
Figure 3:
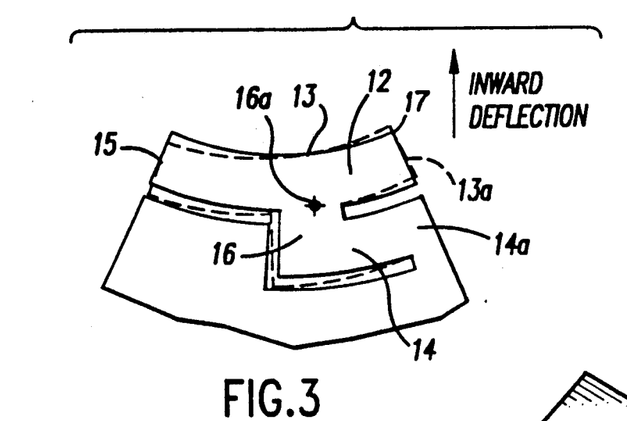
FIG. 3 is an edge view of the pad of FIG. 2 illustrating the pad orientation with the support structure in the loaded state.

Referring now to FIGS. 2 and 3, it will be seen that the pad 12 is provided with an arcuate face 13 which corresponds essentially to the radius or arc of the outer diameter of the shaft which the pad will be supporting (via the fluid film) and each pad is defined by axially extending and radially extending edges. The axially extending edges comprise the leading and trailing edges. The beam is shown both in a static position (solid lines) and in a deflected position (phantom lines) in FIG. 3. The basic construction as illustrated in FIG. 1, is created by the use of small slits or cuts through the wall. Typically these slits or radial cuts are between 0.002 to 0.063" wide. The degree of deflection can be varied by varying, among other things, the length of the cuts.

Longer cuts provide a longer moment arm which yields greater deflection. Shorter cuts yield beams having less flexibility and higher load carrying ability. In selecting a length of cut or slit, care must be taken to avoid resonance.

Figure 9:
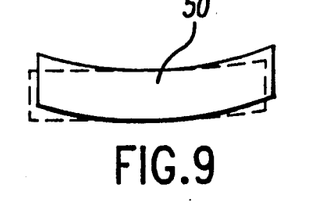
FIG. 9 is an edge view of the pad of FIG. 1 illustrating local deflection of the pad surface without support structure deflection, greatly exaggerated.

By locating the end of beam 14 as shown, the deflection downward about the connection point 16a will result in inward movement of the trailing edge 17 of the pad 12 outward movement of the leading edge 15 and a slight flattening of the pad 12 as seen in the dotted lines of FIG. 9,. As a result of this deflection, the gap between the pad face 13 and the outer surface of the shaft 5, through which fluid flows, becomes wedge shaped to yield the well-known hydrodynamic support effect. Ideally the ratio of the spacing between the trailing edge and the shaft versus the spacing between the leading edge and shaft is between 1:2 to 1:5. In other words, the spacing between the leading edge and shaft should be between 2 to 5 times greater than the spacing between the trailing edge and the shaft. In order to attain this ideal spacing or wedge ratio for any specific application, appropriate deflection variables including number, size, location, shape and material characteristics of the unitary element must be selected. A computer aided finite element analysis has proven to be the most efficacious means of optimizing these variables. Computer aided analysis is particularly useful in a bearing such as the type described above which permits movement in all six directions (six degrees of freedom).

Figure 4:
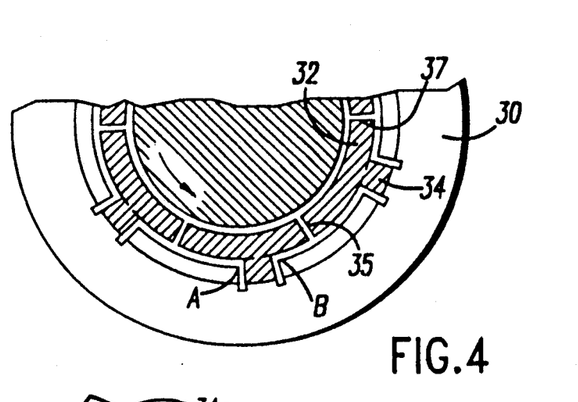
FIG. 4 is a sectional view of a sector of a second example of a journal bearing made in accordance with the present invention.
Figure 5:
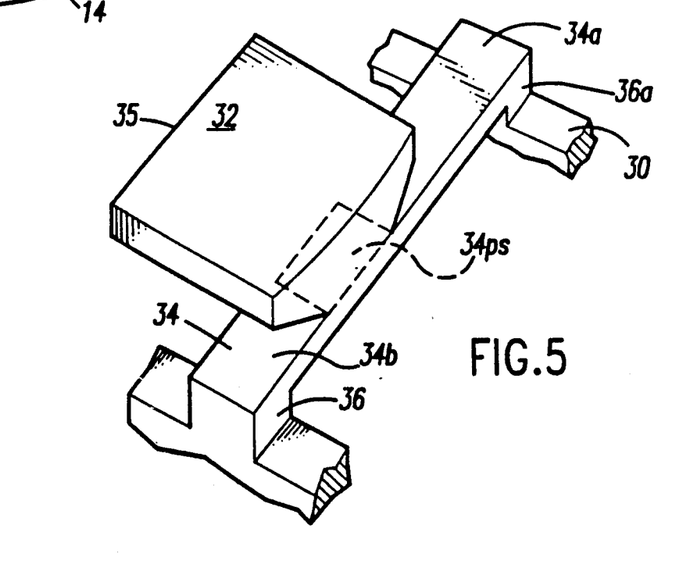
FIG. 5 is a view partly in section of a single pad of FIG. 4.

Referring to FIGS. 4 and 5, there is shown a second illustrative example of a bearing incorporating features of the present invention in which the bearing is formed with slits or cuts and grooves to define a bearing housing 30 with a bearing pad 32 that is supported from the housing by a beam having a pair of beam portions 34a, 34b which extend substantially in a single line away from the pad. Moreover, the pad may be undercut so that it is supported by the beams only on a pad support surface 34ps. Referring to FIG. 5, it will be seen that the beams 34, 34a have a convenient stub beam end as is 36, 36a which acts as a cantilever support for the beam.

Figure 5A:
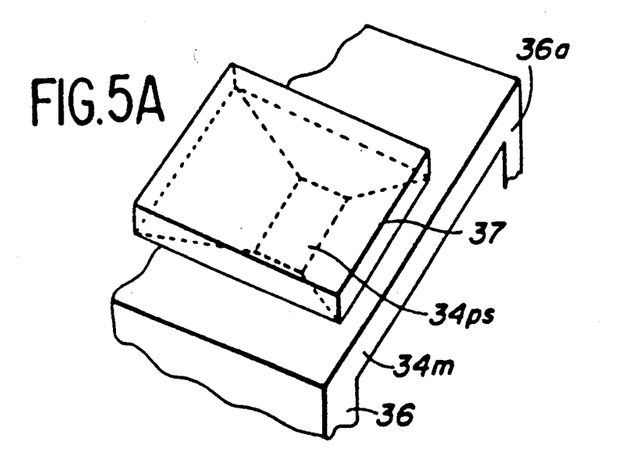
FIG. 5A is a perspective view of a section a modified form of the bearing of FIG. 4.
Figure 5B:
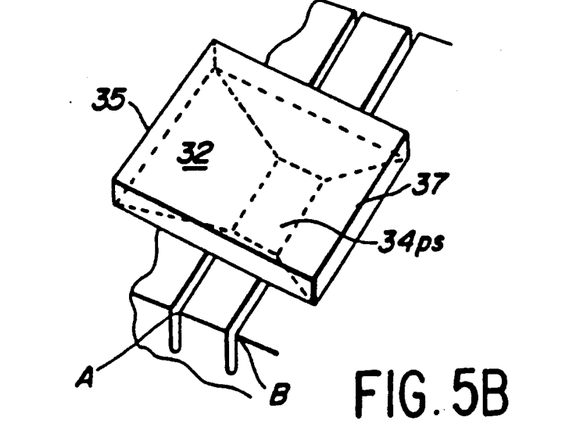
FIG. 5B is a perspective view of a modified form of the bearing shown in FIG. 4.
Figure 6:
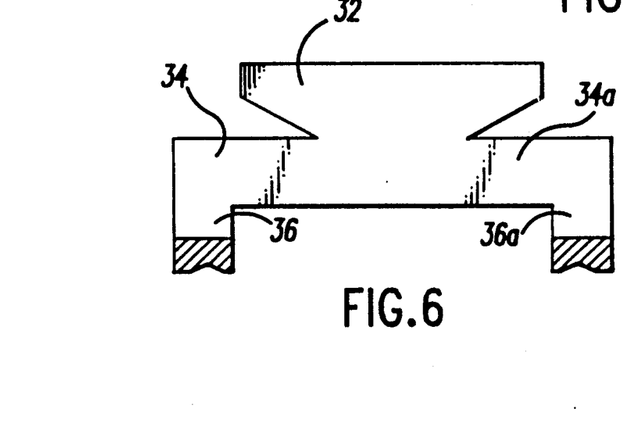
FIG. 6 is an end view of the bearing of FIG. 4.
Figure 7:
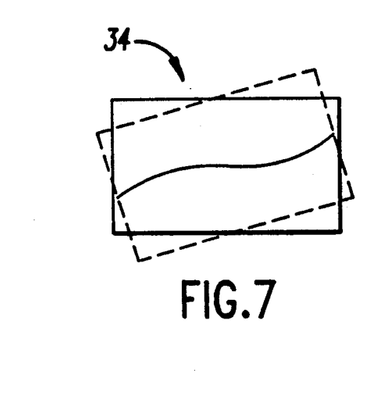
FIG. 7 is a diagramatic view of the torsional deflection of a beam, greatly enlarged.

As is evident from FIG. 4, the perspective view of FIG. 5 shows only a portion of the pad 32. The complete pad is illustrated in FIGS. 5A and 5B which show possible modifications of the bearings illustrated in FIG. 4. As is clear from the drawings, the pad support surfaces 34ps is located closer to the trailing edge 37 than the leading edge 35. With this construction, twisting of the beam, as illustrated in FIG. 7, will take place intermediate the beam and create the torsional deflection illustrated. Again the primary flexibility is developed by small cuts or slits through the bearing housing wall. These cuts provide the bearing pad with six degrees of freedom (i.e., the pad can translate in the $+x, -x, +y, -y, +z$ and $-z$ directions as well rotate about the x, y and z axes). If the cuts or slits were terminated before breaking through to form beam portions 34a and 34b, the pad 32 would be supported by a continuous cylindrical membrane 34m as shown in FIG. 5A. The membrane acts as a fluid damper upon which the pad 32 is supported. The termination of the cuts would occur at Point A and Point B of FIG. 4. The flexibility of the membrane combined with the fluid lubricant, provides a means to vary the damping action and to isolate the pad from the housing. The damping takes the form of a dashpot that exhibits high damping characteristics. As with the bearing illustrated in FIGS. 1-3, the bearing illustrated in FIGS. 4-7 is a unidirectional bearing.

Accordingly, the bearing has a leading edge 35 which deflects outward and a trailing edge 37 which deflects inward to form a wedge. Again, the wedge ratio (ratio of spacing between the trailing edge and the shaft to the spacing between the leading edge and the shaft) should be between 1:2 to 1:5. Moreover, the location of the center of action of the load which is primarily determined by the location of pad support portion 34ps of the beam 34 with respect to the pad should, again, be between the circumferential center of the pad face and the trailing edge, preferably closer to the circumferential center of the pad face.

As shown in FIG. 5B, the beam may be defined more simply than shown in FIG. 5 by simply extending the cuts or slits downward from points A and B.

Figure 8:
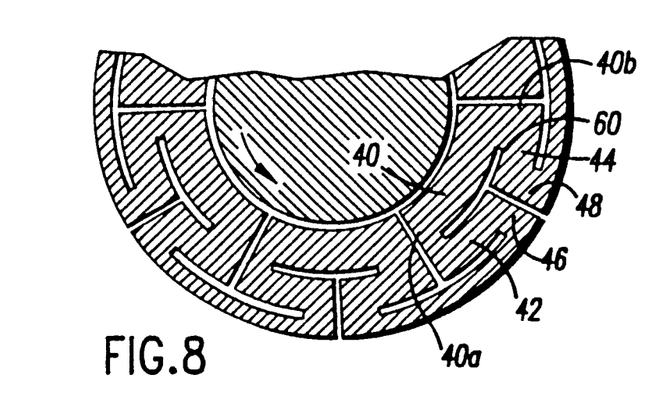
FIG. 8 is a sectional view of a journal bearing illustrating an example of a bearing incorporating the features of the present invention which includes two beams.

Referring to FIG. 8, there is shown the third illustrative example of a bearing incorporating features of the present invention. In this example, internal slits or cuts are provided to create a beam on beam support structure. Specifically, the bearing is formed with grooves and slits or cuts to define a pad 40 which is supported from a housing by beams 42 and 44. The pad is connected to the beams at support stubs 40a and 40b. Beam attachment to the housing is at support stubs 46 and 48. Again the bearing consists of the thin cuts or slits shown cut through the bearing wall. The cut or slit 60 below the pad surface introduces additional flexibility such that under load the pad changes shape to form an airfoil for the introduction of lubricant. Thus, as a result of the beam on beam two point support, the pad acts as a spring like membrane.

Figure 10:
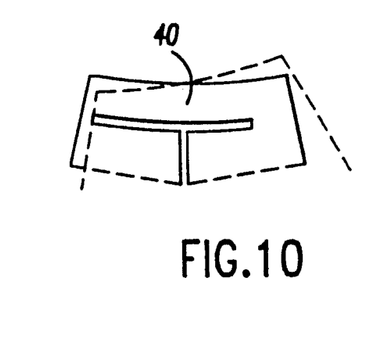
FIG. 10 is an edge view of the pad of FIG. 8 illustrating the pad orientation with the support structure in the loaded state.
Figure 10A:
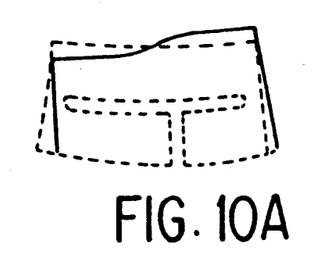
FIG. 10A is an edge view of the pad of FIG. 8 illustrating local deflection of the pad surface greatly exaggerated.

FIG. 10A shows the deflected shape of the pad 40 under load. As shown in the drawings (exaggerated) the pad can be formed and supported so as to deflect to an airfoil shape under load. The airfoil dramatically improves performance. As is evident from the drawings, the pad is capable of displacement in the x, y, and z directions as well as rotation about the x, y, and z axes, that is, the pad has six degrees of freedom.

Referring to FIG. 9, there is shown the local inherent deflection of the face pad 50 where the pad flattens under load. These deflections are combined with the support structure deflection shown in FIGS. 3 and 10 but are of a lower magnitude. The net result is the shape shown in FIGS. 3 and 10 but with a face curvature that has been minutely flattened.

As noted with respect to each of the illustrative examples described above, the bearings of the present invention can be formed to provide for a wedge ratio of 1:2 to 1:5, have a deformable bearing surface the shape of which can be modified, allow six degrees of freedom of the pad, can provide a dashpot type damping action, and are of a unitary construction.

By virtue of the wedge formed by deflection of the bearing pad and the ability of the pad to move with six degrees of freedom, the bearing of the present invention exhibits exceptional performance characteristics. Specifically, the bearing dimensions and deflection variables including number, size, shape, location and material characteristics of the elements defined in the unitary bearing can be tailored for any specific application to support a wide variety of loads. Of these variables, the shape of the support members is particularly important. The impact of shape of the support members on the deflection characteristics of the support structure can be appreciated when the variable formula for moment of inertia $bh^3/12$ (English units) (the main component of sectional modulus for rectangular section, $z = I/c = bh^2/6$) used in an example. Moreover, the ability of the pad to move with six degrees of freedom allows the bearing to compensate for and correct shaft misalignment. In this regard it is noted that the bearings of the present invention have a self correcting characteristic resulting from the tendency of the bearing to return to its non-deflected state due to the stiffness of the bearing. Of course, the stiffness of the bearing is primarily a function of the shape of the support structure, and to a lesser extent the other deflection variables including number, size, location, and material characteristics of the elements defined by the grooves and cuts or slits formed in the unitary element. Stiffer bearings have a greater self-correcting tendency but are less able to adjust for shaft misalignment.

Tests have shown that bearings incorporating the features of the present invention exhibit dramatically improved performance even in comparison to the structure disclosed in my prior patent. In a recent test the bearings of the present invention were utilized in a radial bearing with a radial envelope of 0.091"(2.31 mm). Inward deflections of the bearing pad were 0.0003"(0.0076 mm) which provides exceptional stability and bearing performance. A comparable displacement using the arrangement shown in my prior U.S. Pat. No. 4,496,251 would have required a radial space of 0.30"(7.6 mm).

In conventional hydrodynamic journal bearings, it is typically necessary to provide a fluid-film clearance between the bearing pad surface and the shaft outer diameter. This requires extremely close manufacturing tolerances which can present an obstacle to high volume production. However, the bearings of the present invention can be designed to obviate the need for such close manufacturing tolerances. Specifically, by providing appropriate grooves and cuts or slits, it is possible to define a bearing having virtually any desired performance characteristic. One such characteristic is the stiffness or spring characteristics of the bearing pad in the radial direction, i.e., radial stiffness. It is known in the bearing art that the fluid film between the shaft and the bearing maybe modeled as a spring since it has a calculatable radial fluid film stiffness or spring characteristic. This is true for both compressible and incompressible fluids but is particularly useful in regard to gas fluid lubricants. The radial fluid film stiffness and the radial bearing stiffness act in opposition to one another such that if the radial fluid film stiffness or spring characteristic exceeds the radial bearing stiffness or spring characteristic, the bearing will deflect in the radial direction until the radial stiffness of the fluid and the bearing are in equilibrium. Thus, it has been found that if the bearing is designed such that the radial stiffness of the bearing is less than the radial stiffness of the fluid film, it is not necessary to provide a precise spacing between the shaft and the bearing because the radial stiffness of the fluid film will automatically and instantaneously, upon rotation of the shaft, cause appropriate radial deflection of the bearing. The radial stiffness of the bearing is, of course, primarily a function of the section or flexure modulus of the support structure which depends on the shape of the support structure. The radially stiffness of the pad also depends on the length of the slits or cuts formed in the bearing. Accordingly, with the present invention, it is possible to achieve high performance without the close manufacturing tolerances typically required of hydrodynamic bearings. This aspect of the present invention is particularly useful in high volume production of the bearings and with bearings using gas lubricating fluids.

In small quantities, the bearings disclosed herein are preferably constructed by electrical discharge machining or laser cutting methods. The double lines shown in the drawings are the actual paths of the wire or beam which is typically 0.002–0.060"(0.50–1.52 mm) in diameter. The lubricant that flows into the electrical discharge machined paths, acts as a fluid dampener that reduces any vibration or instability at resonant frequencies. In the situations described above where a continuous cylindrical membrane is formed, the damping takes the form of a dashpot that exhibits high damping characteristics. A significant consideration in the design is that the support structure length and direction be oriented to provide the inward deflection shown in FIG. 3. Also minute deflections of the pads themselves in the direction of load as shown in FIG. 9, result in eccentricity changes which further improve bearing performance. It is noted that in Faires, Design of Machine Elements the distance between the center of the bearing and the center of the shaft is called the eccentricity of the bearing. This terminology is well known to those skilled in bearing design. With the novel approach of tuning or modifying the stiffness of the bearing configuration or structure and particularly the beam to suit a particular bearing application, optimum performance is readily obtained Recent computer analysis has demonstrated that virtually any stiffness or deflection may be accomplished.

As noted above, when manufacturing low volumes or prototypes of the bearings of the present invention, the bearings are preferably constructed by electrical discharge machining or laser cutting methods. Such small volumes or prototypes are usually constructed of metal. However, when high volume production of a particular bearing is contemplated, other methods of manufacture such as injection molding, casting, powdered metal die casting and extrusion are more economical. In connection with such manufacturing methods, it may be more economical to employ plastics, ceramics, powdered metals or composites to form the bearings of the present invention. It is believed that methods such as injection molding, casting, powdered metal die casting with sintering and extrusion are sufficiently well known that the processes need not be detailed herein. It is also believed that once a prototype bearing is constructed, the method of producing a mold or the like for mass production of the bearing is well known to those skilled in the molding and casting art. Moreover, it is to be understood that only certain types of the bearings of the present invention are adapted to be made in high volumes through extrusion. Generally, these are the bearings that are formed only through the provision of circumferential grooves and radial and circumferential cuts or slits which extend axially throughout the entire bearing.

With the foregoing in mind, it is believed sufficient to describe the method of making a single bearing through the use of electrical discharge manufacturing and machining. It is believed that a description of such manufacture demonstrates the ease with which the relatively complex bearing shapes of the present invention can be achieved.

Figure 11A:
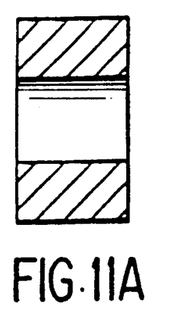
FIGS. 11A and 11B are cross sectional views of a cylindrical journal or blank prior to machining.
Figure 11B:
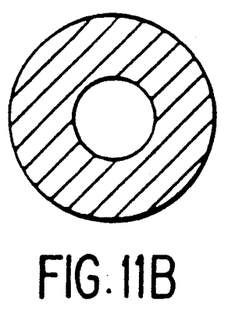
Figure 12A:
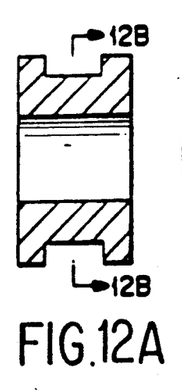
FIGS. 12A and 12B are cross sectional views of a machined journal or blank.
Figure 12B:
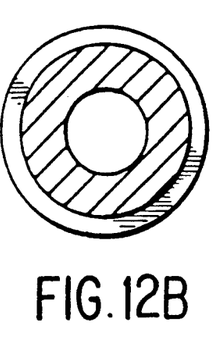
Figure 13A:
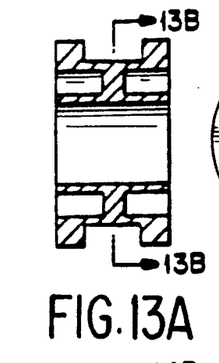
FIGS. 13A and 13B are cross-sectional views of a further machined journal or blank.
Figure 13B:
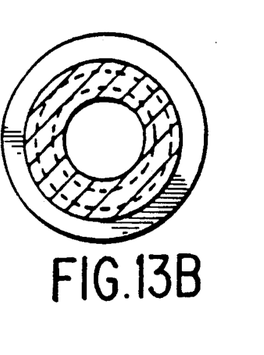
Figure 14A:
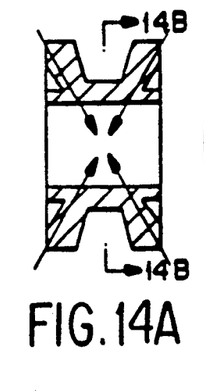
FIGS. 14A and 14B are cross sectional view of a modified machined journal or blank.
Figure 14B:
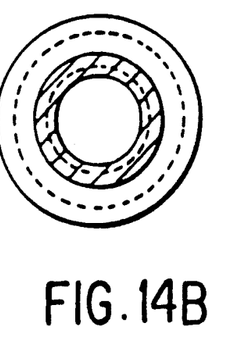

Each bearing is initially in the form of a cylindrical blank having a cylindrical bore as shown in FIGS. 11A and 11B. The blank is then machined to provide a radial lubricating fluid groove as shown in FIGS. 12A and 12B. For certain applications, it is desirable to further machine the blank to include facing grooves which are preferably symmetrically disposed on the radial faces of the bearings as shown in FIGS. 13 and 13B. The provision of such facing grooves ultimately results in a bearing which is easily torsionally deflected. While the groove shown in FIGS. 13A and 13B are cylindrical, it is possible to provide tapered grooves as shown in FIGS. 14A and 14B. As will become evident below, this yields a bearing which exhibits improved deflection characteristics by virtue of the angled alignment of the support beams. In this context, it should be noted that it is preferable that the support beams as viewed in FIG. 14A are tapered along lines which converge at a point proximate the center line of the shaft. This ensures that flexibility occurs about the shaft center line by establishing a center of action for the entire system such that the pads may adjust to shaft misalignment. In essence, the tapering of the support beams causes the bearing to act in a manner similar to a spherical bearing by concentrating the support forces on a single point about which the shaft may pivot in all directions to correct any misalignment. The arrows in FIG. 14A illustrate the lines of action of the deflection.

Figure 14C:
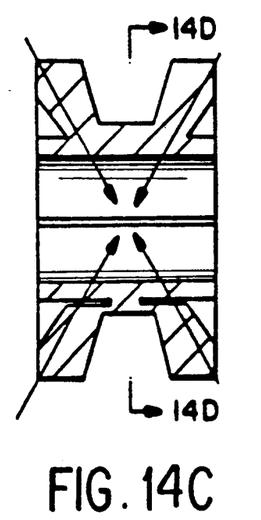
FIGS. 14C and 14D are cross sectional views of a bearing constructed from the modified machined journal or blank FIGS. 14A and 14B.
Figure 14D:
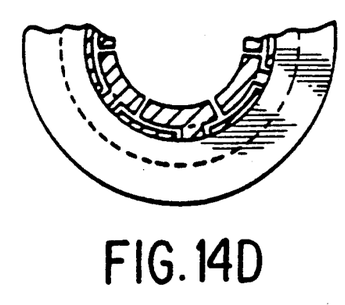

After the cylindrical blank is properly machined as shown in FIGS. 12A and 12B, FIGS. 13A and 13B, or FIGS. 14A and 14B radial and/or circumferential slits or grooves are formed along the radial face of the machined blank to define the bearing pads, the beam supports and the housing. FIGS. 14C and 14D illustrate such grooves formed in the machined blank of FIGS. 14A and 14B. When manufacturing low volumes of the bearings or prototypes of the bearings for use in the construction of a mold, the cuts or slits are preferably formed through electrical discharge manufacturing or through the use of a laser. The machining of the cylindrical blanks to achieve the configurations illustrated in FIGS. 12A and 12B, FIGS. 13A and 13B, FIGS. 14A and 14B or a similar shape can be done through conventional machine tools such as lathe or the like.

The performance characteristics of the bearings of the present invention results from the relative shape, size, location and material characteristics of the bearing pads and the beam supports defined by the cuts or slits formed in the machined blank. These parameters are largely defined by the dimensions and location of the radial circumferential cuts or slits formed in the bearing in conjunction with the shape of the machined blank in which the slits are formed to yield the bearing.

As noted above, while the construction of the bearings of the present invention is most easily understood by reference to the machining process, large scale production of the bearings contemplated by the present invention could be more economically performed through injection molding, casting, powdered metal, die casting, extrusion or the like.

In extruding a large number of bearings from a pipe-like cylindrical blank, radial lubricating fluid grooves as shown in FIGS. 12A and 12B can be provided along the length of the pipe-like cylindrical blank prior to extrusion. However, if facing grooves were desired in the bearing, these can be individually defined after slicing the individual bearings from the extruded and machined blank. For this reason, extrusion might not be a preferred method producing bearings which require facing grooves to enhance torsional flexibility.

What is claimed is:

1. A hydrodynamic bearing adapted to support a shaft, said bearing comprising a unitary cylindrical housing, said housing comprising a radially outer surface and a radially inner surface; said housing being formed with a plurality of radial cuts extending radially outward of the inner surface of the housing and a plurality of circumferential cuts in continuance of said radial cuts; said radial and circumferential cuts together defining a plurality of circumferentially arranged bearing pads and a unitary support structure comprising at least one integral beam-like member that supports each pad, wherein each pad comprises axially extending and radially extending edges and a circumferential shaft engaging face surface, one of said axially extending edges of each pad comprising a leading edge and another axially extending edge of each pad comprising a trailing edge, the face of the pad being adapted under the action of friction and pressure on said surface to rock relative to the support member whereby the trailing edge of the face surface of the pad is moved radially inward toward said shaft and said leading edge is moved radially outward away from said shaft.

2. A bearing as in claim 1 wherein said at least one integral beam-like member twists in a torsional mode.

3. A bearing as in claim 1 wherein said at least one integral beam-like member deflects in a bending mode.

4. A bearing as in claim 1 wherein said at least one integral beam-like member comprises two beam portions which extend on a common axis away from the pad.

5. A bearing as in claim 1 wherein each said pad is supported by two beam-like members which extend on a common axis away from the pad.

6. A bearing as in claim 1 wherein said unitary support structure supports said pad along a pad support surface, said pad support surface being spaced from said axially extending and radially extending edges.

7. A bearing as in claim 1 wherein said at least one beam-like member is connected to the pad by a stub section that is at right angles to said beam-like member.

8. A bearing as in claim 1 wherein the bearing pad is supported by the unitary support structure so as to flatten under load.

9. A bearing as in claim 1 wherein the pad is defined by said radial and circumferential cuts so as to deflect under loading said deflections modifying the eccentricity of the bearing.

10. A bearing as in claim 1 further comprising a fluid lubricant located within the support structure.

11. A bearing as in claim 1 wherein a plurality of said beam-like members extend in a circumferential direction and are radially spaced from the pad.

12. A bearing as in claim 1 wherein a plurality of said beam-like members extend in an axial direction and are spaced from the pad.

13. The bearing as in claim 1 wherein said pad is supported for deflection about a point located circumferentially between said leading edge and said trailing edge.

14. The bearing as in claim 1 wherein said pad has an axially extending circumferential centerline, said pad being supported such that loads applied thereto act at a point located between said circumferential centerline and said trailing edge.

15. The bearing of claim 1 wherein each of said pads is supported by said support structure to allow movement with six degrees of freedom.

16. The bearing of claim 1 wherein the pad is supported such that under normal loading, the pad deflects such that the trailing edge is between two to five times closer to the shaft than the leading edge.

17. A hydrodynamic bearing for supporting a shaft rotating in a housing comprising a cylindrical journal having a cylindrical bore and a plurality of thin radial and circumferential cuts formed therein, said bore and said cuts defining a plurality of bearing pad means, and unitary support structures for supporting each of said bearing pads;

each of said pad means comprising a load engaging face member, said face member being separated from said housing by the unitary support structure, the unitary support structure comprising at least one beam-like member having at least a portion thereof extending substantially parallel to a plane that is tangent to at least one line of contact with said face member, said face member having a load engaging surface to operatively support an opposing relatively moving part of said shaft, said face member being adapted under the action of friction and pressure on said load engaging face surface to move relative to the housing to form a converging wedge shape to operatively support said shaft part in a bearing relationship, said support structures supporting said bearing pad for at least one of radial deflection and torsional twisting.

18. The bearing of claim 17, wherein said bearing pad means, said unitary support structures and said housing are formed from a unitary member.

19. A bearing for supporting a shaft, said bearing comprising a plurality of circumferentially spaced bearing pads, said bearing pads comprising a leading edge, a trailing edge and a circumferentially curved bearing face extending between said leading edge and said trailing edge, each said bearing pad being supported by a unitary support structure for movement with six degrees of freedom, said support structure supporting said bearing pad such that said bearing pad has predetermined radial stiffness, a fluid film located between said bearing pad face and said shaft, said fluid film having a characteristic radial stiffness, wherein the radial stiffness of the fluid film is greater than the radial stiffness of the bearing pad such that said fluid film causes said bearing pads to deflect radially outward upon rotation of said shaft wherein the bearing includes a longitudinally extending circumferential facing groove extending inward from each axial face of the bearing to provide the bearing pads with torsional flexibility.

20. A bearing for supporting a shaft, said bearing comprising a plurality of circumferentially spaced bearing pads, said bearing pads comprising a leading edge, a trailing edge and a circumferentially curved bearing face extending between said leading edge and said trailing edge, each said bearing pad being supported by a unitary support structure for movement with six degrees of freedom, said support structure supporting said bearing pad such that said bearing pad has predetermined radial stiffness, a fluid film located between said bearing pad face and said shaft, said fluid film having a characteristic radial stiffness, wherein the radial stiffness of the fluid film is greater than the radial stiffness of the bearing pad such that said fluid film causes said bearing pads to deflect radially outward upon rotation of said shaft further comprising a radially inward extending groove formed in the outer periphery of the bearing to provide the bearing with radial flexibility.

21. A unitary bearing for supporting a shaft, said bearing having an inner periphery and an outer periphery and comprising a plurality of circumferentially spaced bearing pads, each said pad including a leading edge, a trailing edge and a circumferential curved pad face extending between said leading edge and said trailing edge;

a support structure comprising a plurality of support members located radially outwardly of said bearing pad, the support structure including a network of interconnected support members which are arranged such that there is a radial space between every point on each bearing pad surface and the outer periphery of the bearing and supporting said bearing pad for movement with respect to said beam member and a housing, with six degrees of freedom.

22. The bearing of claim 21 further comprising a radially inward extending groove formed in the outer periphery of the bearing to provide the bearing with radial flexibility.

23. The bearing of claim 21 wherein said bearing pad face has an axially extending circumferential centerline and said support portion supports said bearing pad only at a point between said circumferential centerline and said trailing edge.

24. The bearing of claim 21 in which the bearing is supported so as to deflect under loading about a point between said leading edge of said trailing edge such that said trailing edge deflects radially inward and said leading edge deflects radially outward such that said trailing edge is between two to five times closer to said shaft than said leading edge is to said shaft.

25. The bearing of claim 21 wherein said pads are formed so as to flatten under load across the entire face, thereby altering the eccentricity of the bearing.

26. The bearing of claim 21 wherein the bearing includes a longitudinally extending circumferential facing groove extending inward from each axial face of the bearing to provide the bearing pads with torsional flexibility.

27. The bearing of claim 21 wherein said pads support said shaft for pivoting movement about a point proximate the centerline of the shaft to accommodate misalignment of the shaft.

28. A bearing of claim 21 wherein said bearing is constructed of plastic.

29. The bearing of claim 21 wherein said bearing is constructed of a ceramic material.

30. The bearing of claim 21 wherein said bearing is constructed of bronze.

31. The bearing of claim 21 wherein said bearing is formed from a sintered powdered metal.

32. The bearing of claim 21 wherein said beam is supported for pivoting movement with respect to said housing about a point which is located angularly between said circumferential centerline and said trailing edge.

33. The bearing of claim 21 wherein the bearing has a discontinuous cross section.

34. A bearing for supporting a shaft, said bearing comprising a plurality of circumferentially spaced bearing pads, each said bearing pad comprising a leading edge, a trailing edge and a circumferentially curved face; a unitary support structure for supporting each of said bearing pads, said support structure including at least one of a circumferential beam, a longitudinal beam and a longitudinal membrane for supporting said pads for movement with six degrees of freedom such that under normal loading said trailing edge of said pad is deflected radially inward toward the shaft and said leading edge of each said pad is deflected radially outward.

35. The bearing of claim 34 wherein the bearing has a discontinuous cross section.

36. The bearing of claim 34 wherein the bearing includes a longitudinally extending circumferential facing groove extending inward from each axial face of the bearing to provide the bearing pads with torsional flexibility.

37. The bearing of claim 34 further comprising a radially inward extending groove formed in the outer periphery of the bearing to provide the bearing with radial flexibility.

38. The bearing of claim 34 wherein said bearing pads are unitary with said support structures.

* * * * *